United States Patent [19]

Fiorentini

[11] 4,096,585
[45] Jun. 20, 1978

[54] APPARATUS FOR MIXING AND EJECTING INTERACTING FLUID MATERIALS

[75] Inventor: Carlo Fiorentini, Varese, Italy

[73] Assignee: AFROS S.r.l., Caronno Pertusella (Varese), Italy

[21] Appl. No.: 743,956

[22] Filed: Nov. 22, 1976

[30] Foreign Application Priority Data

May 17, 1976 Italy ............................. 23330 A/76

[51] Int. Cl.² ........................ B01F 15/04; B01F 15/06
[52] U.S. Cl. .................................. 366/134; 366/144; 366/159
[58] Field of Search ............................ 259/4 R, 18, 36; 23/252 R; 137/607; 366/134, 144

[56] References Cited
U.S. PATENT DOCUMENTS

| | | | |
|---|---|---|---|
| 3,176,922 | 4/1965 | Decker | 239/112 |
| 3,375,978 | 4/1968 | Rennie | 239/113 |
| 3,784,169 | 1/1974 | Bockmanna | 259/4 |
| 3,876,145 | 4/1975 | Gusmer | 239/112 |
| 3,905,582 | 9/1975 | Fiorentini | 259/4 R |
| 3,912,234 | 10/1975 | Peter | 259/4 R |
| 3,913,892 | 10/1975 | Ersfeld | 259/4 R |
| 3,926,219 | 12/1975 | Ersfeld | 259/4 R |
| 3,945,569 | 3/1976 | Sperry | 239/112 |
| 3,976,248 | 8/1976 | Middleton | 239/416.1 |

Primary Examiner—Robert W. Jenkins
Attorney, Agent, or Firm—Fleit & Jacobson

[57] ABSTRACT

An apparatus for mixing and ejecting fluid materials interacting with one another; said apparatus comprises at least a head having a mixing chamber with an outlet opening for the mixture at one end thereof, and having inlet ports, each of which connected to a supply line for a component. Each inlet port is connectable, through a distributing valve, with an orifice opening into the mixing chamber and respectively with an outlet port connected to a return line for a recycle at a first pressure rate of each component to a reservoir. A pin is reciprocable by a first double-acting cylinder to and away from the outlet opening of the mixing chamber; the distributing valves are operated by a second double-acting cylinder parallel connected to said first cylinder, one side of said second cylinder being directly connected to a pressure fluid source, and the other side being connected to pressure source by means of a shut off valve operable by the piston of the first cylinder at the end of its backward stroke. The return line for each of the components is further provided with a branched conduit having a valve defining a narrow orifice for a recycle at a higher pressure rate than the former.

5 Claims, 4 Drawing Figures

APPARATUS FOR MIXING AND EJECTING INTERACTING FLUID MATERIALS

This invention relates to an apparatus for mixing and ejecting fluid materials interacting with one another. More particularly it relates to an apparatus for providing a homogeneous mixture of liquid and/or gas materials by means of a suitable head, wherein the mixture can be sprayed, poured or injected into a mould, wherein the various components of the mixture interact with one another to form synthetic resin articles.

Apparatus of the above type are generally known, using mixing and injecting heads for the mixed materials, and having a mixing chamber of a constant cross-section terminating with an open end thereof, and having inlet orifices for the individual components at retracted locations relative to the open end of said chamber. A pin is reciprocated in said chamber in order to keep it under constantly clean condition at the end of each operation.

It is also known that the components should be continuously recycled at a relatively reduced pressure, in the following also referred to as low pressure, in order to heat stabilize the component parts or elements of the apparatus, since the temperature control for the chemical reactions is of extreme importance. Moreover, for cast or injection molding operations, a homogeneous mixing of the components in a weight ratio thereof has to be accomplished. Therefore, it is required to provide a recycle step at a higher pressure than the former, particularly at almost the same pressure as that of injection, hereinafter also referred to as high pressure, in order to obtain still a mixture of a uniform composition, which could otherwise give rise to faults in the articles being produced.

Thus, the recycle steps should always occur through the individual moulding heads, but without unduly complicating the construction or operation of the latter.

Accordingly, it is the object of the present invention to provide an apparatus of the above mentioned character, wherein both said low pressure recycle and high pressure recycle occur through the same moulding head, and wherein said head comprises a valve system providing the transition from the low pressure recycle step to the material mixing and injecting step, whereas the high pressure cycle for each of the components is provided through the action of a distinct device common for one or more heads of the apparatus.

The independence of the head valve controls from the device for said high pressure recycle, will free the movement of the cleaning pin for the mixing chamber from the control of a distributing valve of the single components comprising the mixture to respective return lines during recycle steps, or respectively to the inlet orifices of the mixing chamber, so that this mixing chamber can be made of unlimited length.

This affords the possibility of delivering always homogeneous mixtures having a laminar flow, that is free of any turbulence, as otherwise occurs with a known mixing chamber of a limited length. Thus, as the length of the mixing chamber increases, the kinetic energy of the various components will be taken advantage of to a larger extent to provide a homogeneous mixing thereof and a laminar flow at the outlet end of the chamber.

The problem has been solved by an apparatus according to the invention for mixing and ejecting fluid materials interacting with one another, such an apparatus comprising at least one head provided with a mixing chamber having an outlet aperture for the mixture at one end thereof, said head having inlet ports, each of which connected to a line or conduit for supplying a mixture component, each of said inlets being connectable, for fluid communication through a distributing valve, with an orifice in said mixing chamber, or respectively with an outlet port connected with a return line or conduit for a recycle at a first pressure rate of each component to a tank or reservoir, and a reciprocating pin operated by a first double-acting cylinder to and away from the outlet of the mixing chamber, in which said distributing valves are operated by a second double-acting cylinder parallel connected to said first cylinder, one side of said second cylinder being directly connected to the pressure fluid source, and the other side being connected to pressure source, by means of a shut off valve operable by the piston of said first cylinder, at the end of its backward or return stroke, and in which the return line of each component is provided with a branched conduit having inserted therein an actuating valve defining a narrow orifice for a recycle at a higher pressure rate than the former.

The invention will now be described in further detail with reference to the accompanying drawings, in which.

Figure 1:
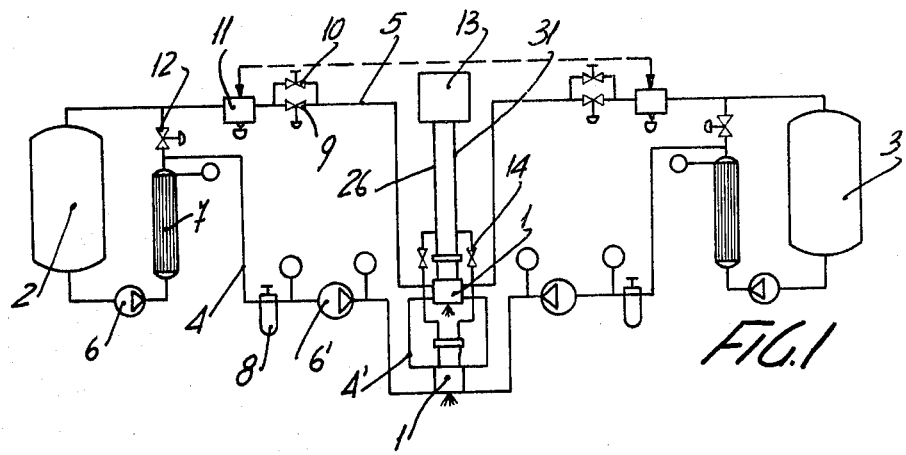
FIG. 1 is a schematic representation showing the whole apparatus according to the invention which can be provided for controlling one or more moulding heads.

Referring to FIG. 1, the general diagram of the apparatus is shown as comprising substantially one or more moulding heads 1 for mixing the components stored in suitable tanks or reservoirs 2 and 3, respectivley, where a two-component mixture is concerned, as shown, and feeding the mixture to a mould (not shown).

More particularly, the reservoir or tank 2 for each of the components is connected through a supply line 4 to a component inlet of the head 1, these latter having an outlet which in turn is connected by means of 4' (where a plurality of heads are concerned) to the inlet for the same component of a next subsequent head 1, the outlet for the component of the last head being connected to reservoir or tank 2 through a return line 5. This is also true for the other components, as schematically shown in the right side of FIG. 1.

A first supply pump 6 is inserted in each of said supply lines 4, and provides for supplying the component from reservoir or tank 2 through a heat exchanger 7 and a filter 8 to a second positive-displacement pump for supplying the individual heads 1. Correspondingly, on each of said return lines 5 there are provided a first automatic shut off valve 9 for a low pressure recycle, a second automatic valve 10 in a branched conduit for high pressure recycle, as below described in further detail and a calibrating head 11. An offtake or shunt is provided by means of an automatic backpressure valve 12 between the outlet of said heat exchanger 7 and return line 5 downstream of calibrating head 11 for enabling excess fluid supplied by pump 6 to return back to reservoir or tank 2.

Each of mixing heads 1 comprise a component mixing and ejecting chamber, having a cleaning pin slidably mounted therein, and distributing valves which are operable for component circulation to the mixing chamber in head 1, or respectively to said return line 5 for a low or high pressure recycle through the head, as below referred to. Both said cleaning pin of the mixing chamber and switching valves are operated by oleodynamic cylinders supplied from a pressure fluid source schematically shown in 13.

The oleodynamic circuits for the various heads 1 can be parallel interconnected at said source 13 and suitable automatic valves 14 allow for or cut off pressure fluid supply to the circuit of each head.

Figure 2:
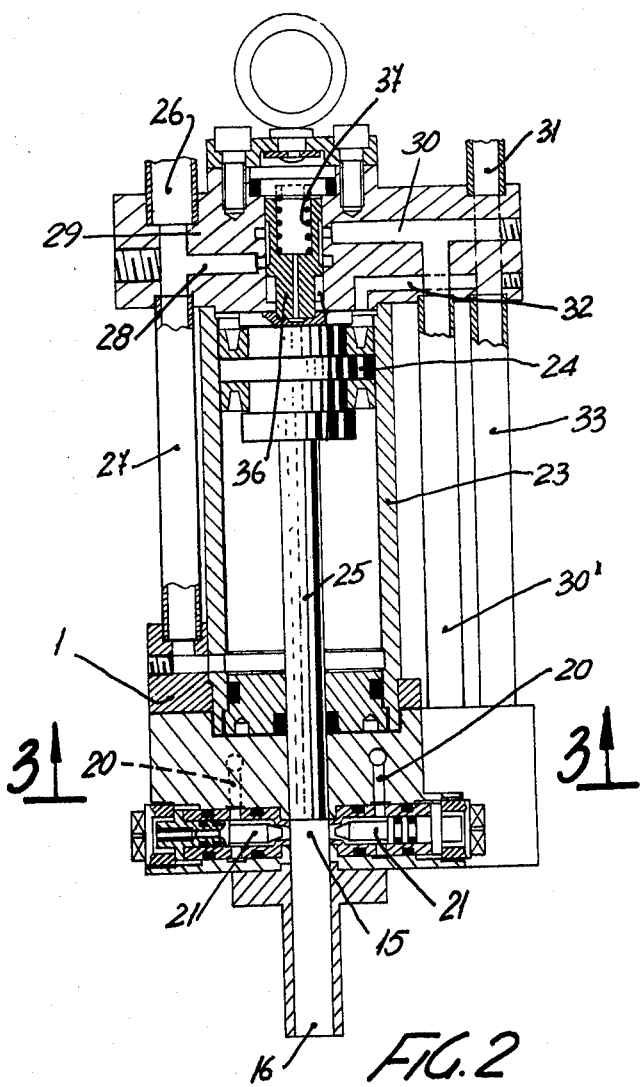
FIG. 2 is an enlarged longitudinal sectional view of one moulding head of the apparatus shown in FIG. 1.
Figure 3:
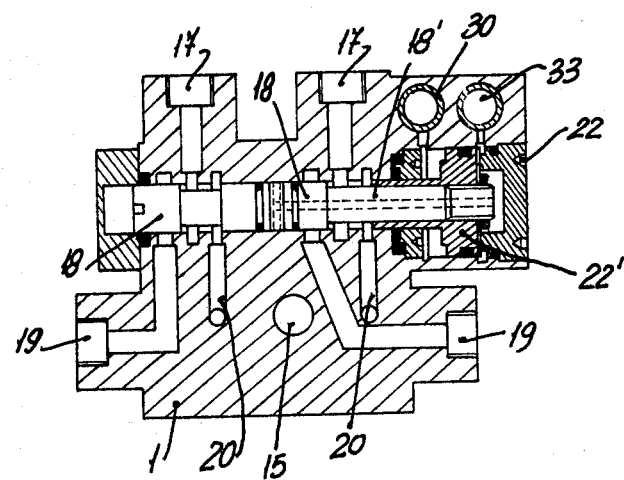
FIG. 3 is a cross-section of the head taken along line III—III of FIG. 2.
Figure 4:
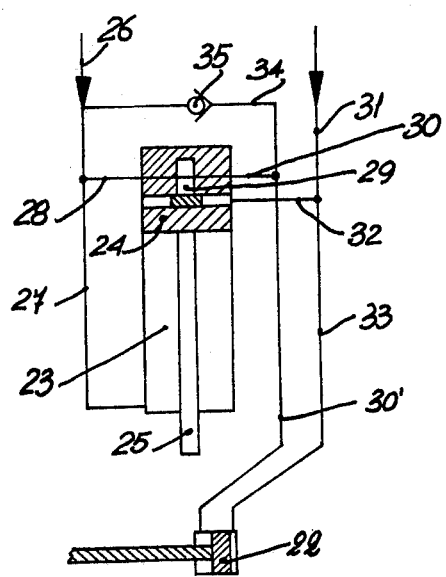
FIG. 4 is an oleodynamic diagram for the connections between the driving cylinders in the head.

Referring to FIGS. 2 and 3, an exemplary embodiment of a head according to the invention will be described, while referring to FIG. 4 its oleodynamic diagram will be illustrated.

Each head 1 comprises a body member or portion defining a mixing chamber 15 of a constant cross-section, the end 16 of which is open for association, for example, with a mould into which there has to be cast or injected the mixture comprising two or more chemical components, the latter interacting with one another to form a resin which on expanding or filling up the mould cavity will assume the shape of the latter.

As shown in the sectional view of FIG. 3, each of the components are supplied through an inlet 17 to a distributing type of three-way valve 18, the piston 18' of which, depending on the assumed axial position, is capable of communicating the inlet port with an outlet port connected with an head outlet 19', or respectively with a conduit 20 which through an orifice of needle valve 21 (FIG. 2) opens into said mixing chamber 15 of the head 1.

As it will be seen in FIG. 3, where a two-component head is concerned, pistons 18' of distributing valves 18 for each single component will slide in a plane at right angle to the mixing chamber and are mechanically and axially interconnected each other for drive by the movement of piston 22' of a single double-acting cylinder 22 provided in the body member of the head. Thus, by means of a single drive or control, all of the components within mixing chamber 15 can be supplied or recycled to the respective reservoirs or tanks.

The head inlets and outlets 17 and 19, respectively, are dimensioned to allow for a recycle at a first pressure rate, in the following also referred to as low pressure recycle, through valve 9 in said return line 5, when shunt valve 10 is closed, whereas a recycle at a second pressure rate higher than the former, and hereinafter also referred to as high pressure, can occur through valve 10 with valve 9 at closed condition.

The head 1 also comprises a second double-acting cylinder 23 coaxial with said mixing chamber 15 (FIG. 2), having a piston 24 sliding therein and integral with a pin 25, the latter being reciprocable within mixing chamber 16 between a retracted position, as shown in FIG. 2 for enabling the feeding components through the opposite orifices of valves 21, and an advanced or shut off position towards the outlet end 16 of the chamber to allow for cleaning the latter. As previously mentioned, both control or drive cylinder for distributing valves 18 and control or drive cylinder 23 for pin 25 are operated by means of a pressure fluid circulated from an oleodynamic source 13, since said cylinders are parallel interconnected.

More particularly, line or conduit 26 from source 13 branches off with conduit 27 to the front side of cylinder 23, while through conduit 28, said shut off valve 29 and conduit 30 and 30' branch off to the front side of double-acting cylinder 22 controlling or driving said distributing valves 18. Similarly, the other conduit 31 from source 13 first branches off with conduit 32 to the rear side of drive or control cylinder 23 for cleaning pin 25 of the mixing chamber, while branching off with the other conduit 33 to the rear side of the drive or control cylinder for distributing valves 18. A shunted conduit 34 having a non return valve 35 (FIG. 4) can be provided between said conduit 30 and conduit 26 for return of fluid which is on the rear side of piston valve 29 for the drive or control cylinder of the distributing valves of the mixture components. The oleodynamic diagram for the drive or control circuits of the two double-acting circuits is summarized in FIG. 4 of the appended drawings, from which figure and from preceding FIG. 2, it will be seen that valve 29 is a distributing type of valve and is operated by piston 24 of cylinder 23 at the end of its return stroke.

Particularly, as shown in FIG. 2, said valve 29 is a valve having a cylindrical shutter 36 which is constantly urged to advance by a spring 37 to a position for shutting off said conduits 28 and 30. This shutter 36 projects into the chamber of the driving cylinder 23 for pin 25, to be upward forced by piston 24, when the latter is at its top or fully retracted position shown in FIG. 2. Of course, if desired, said valve 29 could also be of another design, without departing for this from the above set forth matter.

The operation of the apparatus according to the invention is substantially as follows. Assume that all of heads 1 are at low pressure recycle condition, that is with said pin 25 fully lowered into mixing conduit or chamber 15, valves 29 at shutting off position thereof and distributing valves 18 at opposite condition relative to that of FIG. 3, that is to say at the position where the component inlets 17 are thereby communicated with the respective outlets 19.

Under these conditions, the components are recycled at a first pressure rate through all of heads 1 by means of pumps 6 and 6' of each of the apparatus circuits. Having now to operate the head or one of the heads, high pressure recycle valves 10 are opened, while closing at the same time shut off valves 9. Therefore, a recycle step for the components is carried out at a higher pressure rate than the former for the entire time period required. Thus, by a suitable control imparted to oleodynamic source 13, fluid under pressure is introduced into conduit 26 and then through conduit 27 on the front side of cylinder 23. Simultaneously, a pressure is also built up in conduit 28, because of valve 29 being still closed.

Under these conditions, piston 24 of cylinder 23 is retracted, thereby causing retraction of pin 25 beyond the orifices of valves 21 in the mixing chamber. When piston 24 arrives almost at the end of its upward stroke, it strikes against shutter 36, upwardly displacing the latter against reaction spring 37, whereby valve 29 is opened. Now, pressure fluid in conduit 28 can pass through valve 29, and is supplied therefrom along conduit 30 to the front side of the drive or control cylinder 22 for the distributing valves of the components. Thus, piston 22' controls distributing valves 18 to move under the condition shown in FIG. 3, wherein the inlet 17 of the components are communicated with conduits 20 leading to the head mixing chamber 15. Therefore, the components are injected, as throughly intermixed and delivered, that is poured or injected into suitable moulds.

Upon completion of casting or injecting step, a second control imparted by source 13 reverses the fluid directon in oleodynamic circuit of the head, retracting piston 22', then switching valves 18, and at the same time lowering piston 24 along with pin 25 sliding throughout along mixing chamber 15, thus completely cleaning the latter. As soon as piston 24 is lowered, spring 37 downward urges shutter 36 of valve 29, shutting off conduits 28 and 30. In the meanwhile, high pressure recycle valves 10 had been closed and valves 9 reopened, whereby the single components can recycle again at a low pressure until the next subsequent casting or injecting operation is performed.

It is to be understood that the matter above discussed and shown with reference to the appended drawings has been given by mere way of illustration and that further variations or modifications or specific solutions could be adopted for the various components without departing from the inventive principles.

What is claimed is:

1. An apparatus for mixing and ejecting fluid materials, comprising a head defining a mixing chamber, said head including an outlet opening for ejecting the mixture at one end thereof, a plurality of inlet ports, each of said inlet ports communicating with a supply line for supplying a fluid material component, a distributing valve, each of said inlet ports communicating, through said distributing valve, with an orifice opening into the mixing chamber and with an outlet port, said outlet port connected to a return line for recycling the fluid material component at a first pressure rate through a reservoir; a pin connected to a piston and reciprocable in a first double-acting cylinder for moving said pin to and away from said outlet opening of the mixing chamber, said distributing valve being operated by a second double-acting cylinder connected in parallel with said first cylinder, whereby one side of said second cylinder is directly connected to a pressure fluid source and to one side of said first cylinder, the other side of said second cylinder is connected to a pressure fluid source and to the other side of said first cylinder through a shut off valve means operable by the piston of the first cylinder at the end of its backward stroke; and wherein said return line for the fluid material component is provided with a branched conduit having a valve defining a narrow orifice for recycling the fluid material component at a higher pressure rate than the first pressure rate.

2. An apparatus according to claim 1, further comprising a plurality of distributing valves, each associated with a respective inlet port, wherein said distributing valves are in line to be opened and closed by pistons mechanically interconnected and controlled by said second double-acting cylinder.

3. An apparatus according to claim 1, in which the distributing valve is controlled by pistons sliding in a plane at right angles to the mixing chamber.

4. An apparatus according to claim 1, in which said shut off valve means comprises a sliding shutter axially aligned with the pin and spring means for urging said shutter to its closed condition.

5. An apparatus according to claim 4, in which said sliding shutter of the shut off valve means projects into the first double-acting cylinder chamber.

* * * * *